United States Patent [19]

Takenaka et al.

[11] Patent Number: 5,149,106
[45] Date of Patent: Sep. 22, 1992

[54] LIP SEAL DEVICE

[75] Inventors: Akira Takenaka; Keiichi Shimasaki; Hiroshi Kanayama, all of Aichi, Japan

[73] Assignee: Taiho Kogyo Co., Ltd., Aichi, Japan

[21] Appl. No.: 834,980

[22] Filed: Feb. 14, 1992

Related U.S. Application Data

[63] Continuation of Ser. No. 547,255, Jul. 3, 1990, abandoned.

[30] Foreign Application Priority Data

Jul. 4, 1989 [JP] Japan ................... 1-172563

[51] Int. Cl.$^5$ ............................................. F16J 15/32
[52] U.S. Cl. ........................................ 277/37; 277/47; 277/152
[58] Field of Search .................. 277/37, 47-51, 277/165, 45, 166

[56] References Cited

U.S. PATENT DOCUMENTS

| | | | |
|---|---|---|---|
| 2,316,941 | 4/1943 | Dodge | 277/49 |
| 2,326,286 | 8/1943 | Bush | 277/49 |
| 2,345,588 | 4/1944 | Dodge | 277/49 |
| 2,596,174 | 5/1952 | Reich | 277/49 |
| 3,269,736 | 8/1966 | Hieber et al. | 277/47 |
| 3,549,445 | 12/1977 | McMahon | 277/47 |
| 4,721,314 | 1/1988 | Kanayawa et al. | 277/152 |
| 4,755,115 | 7/1988 | Akaike | 277/152 |

Primary Examiner—William A. Cuchlinski, Jr.
Assistant Examiner—Daniel G. DePumpo
Attorney, Agent, or Firm—Sughrue, Mion, Zinn, Macpeak & Seas

[57] ABSTRACT

A lip seal device comprises: a case surrounding a rotary shaft; a lip having an outer peripheral base end portion secured to the case, and an inner peripheral front end portion curved towards a sealed fluid so as to be in sliding contact with said rotary shaft; and an annular groove formed in the sealing surface of the front end portion of the lip. The lip seal device further comprises an elastic retaining member arranged in such a manner that the outer peripheral base end portion secured to the case, the inner peripheral front end portion is laid over the front end portion of the so as to push the front end portion of the lip against the rotary shaft, and the front end portion of the retaining member is held spaced from the rotary shaft, whereby even when the lip seal device is vibrated or the rotary shaft vibrates, an excellent sealing effect can be expected.

2 Claims, 1 Drawing Sheet

LIP SEAL DEVICE

This is a continuation of application Ser. No. 07/547,255, filed Jul. 3, 1990 now abandoned.

BACKGROUND OF THE INVENTION

This invention relates to a lip seal device with a lip which is slidably mounted on a rotary shaft.

One example of a conventional lip seal device comprises: a case surrounding a rotary shaft which is rotatably supported; a lip having an outer peripheral base end portion which is secured to the case, and an inner peripheral front end portion which is curved towards a sealed fluid and is in sliding contact with the outer surface of the rotary shaft; and an annular groove formed in the sealing surface of the lip which is in contact with the rotary shaft, the annular groove being a continuous-ring-shaped one which is perpendicular to the axis of the lip (Japanese Patent Application (OPI) No. 112082/1989 (the term "OPI" as used herein means an "unexamined published application")).

In another example of the conventional lip seal device, the outer peripheral base end portions of two lips are secured to a case, the inner peripheral front end portions of the two lips are curved towards the sealed fluid in such a manner that they are in slide contact with a rotary shaft, and the front end portion of one of the two lips, which is closer to the sealed fluid, is laid over the front end portion of the other lip to urge the latter towards the rotary shaft (Japanese Utility Patent Application (OPI) No. 20569/1988).

In the former lip seal device, the annular groove is formed in the lip as was described above; in other words, in the lip, the part having the annular groove is smaller in thickness than the remaining. Accordingly the part is readily deformed when pushed by the sealing fluid. As a result, two parts on both sides of the annular groove are more strongly pushed against the rotary shaft (hereinafter referred to as "contact parts", when applicable). Since the annular groove is continuous circumferentially of the lip, the contact parts are also each in the form of a continuous ring, thus providing a double seal action. Thus, the lip seal device provides excellent sealing effect not only when the rotary shaft is stopped but also when it is rotating.

However, the lip seal device suffers from the following difficulty: In general, the lip is made of a relatively hard material such as PTFE in order to improve its durability. Hence, when the lip seal device is greatly vibrated, or when the rotary shaft vibrates due to its eccentricity or play, the front end portion of the lip is raised from the rotary shaft being unable to follow the vibration, so that the fluid may leak out.

In the latter lip seal device, the double sealing action provides an excellent sealing effect. In the case where the lip closer to the sealed fluid is made of a relatively soft material such as soft rubber, it pushes the front end portion of the other lip against the rotary shaft. Hence, even if the other lip is made of a relatively hard material which is high in durability, it is prevented from being raised from the rotary shaft. Thus, even when the lip seal device is significantly vibrated, or when the rotary shaft vibrates do to its eccentricity or play, an excellent sealing effect is obtained.

However, the lip seal device is also disadvantageous as follows. Where the lip closer to the sealed fluid is made of a relatively soft material such as soft rubber, then its durability is lower, and it is liable to be damaged when subjected to high speed and high pressure. If the lip loses its sealing action, then the lip seal device effectively has only one lip, as a result of which it is difficult for the lip seal device to have a sufficiently high sealing effect.

SUMMARY OF THE INVENTION

Accordingly, an object of this invention is to eliminate the above-described difficulties accompanying a conventional lip seal device.

The foregoing object and other objects of the invention have been achieved by the provison of a lip seal device comprising: a case surrounding a rotary shaft which is rotatably supported; a lip having an outer peripheral base end portion which is secured to the case, and an inner peripheral front end portion which is curved towards a sealed fluid and is in slide contact with the outer surface of the rotary shaft; and an annular groove formed in the sealing surface of the lip which is in contact with the rotary shaft, the annular groove being continuous circumferentially of the rotary shaft, which, according to the invention, further comprises: an elastic retaining member arranged in such a manner that the outer peripheral base end portion of the retaining member is secured to the case, the inner peripheral front end portion of the retaining member is laid over the outer surface of the front end portion of the lip so as to urge the front end portion of the lip towards the rotary shaft, and the front end portion of the retaining member is held spaced from the rotary shaft.

With the lip seal device of the invention, the lip's contact parts on both sides of the annular groove provide a double sealing action ensuring an excellent sealing effect. The retaining member, pushing the front end portion of the lip against the rotary shaft, does not directly take part in the sealing action on the rotary shaft, and therefore it can be made of a soft material such as rubber. Hence, even when the lip seal device is greatly vibrated, or when the rotary shaft vibrates due to its eccentricity or play, the front end portion of the lip can be maintained closely against the rotary shaft. That is, with the lip seal device of the invention, an excellent sealing effect can be obtained even under the above-described adverse conditions.

The nature, principle and utility of the invention will become more apparent from the following detailed description when read in conjunction with the accompanying drawing.

DETAILED DESCRIPTION OF THE INVENTION

Preferred embodiments of this invention will be described with reference to the accompanying drawing.

Figure 1:
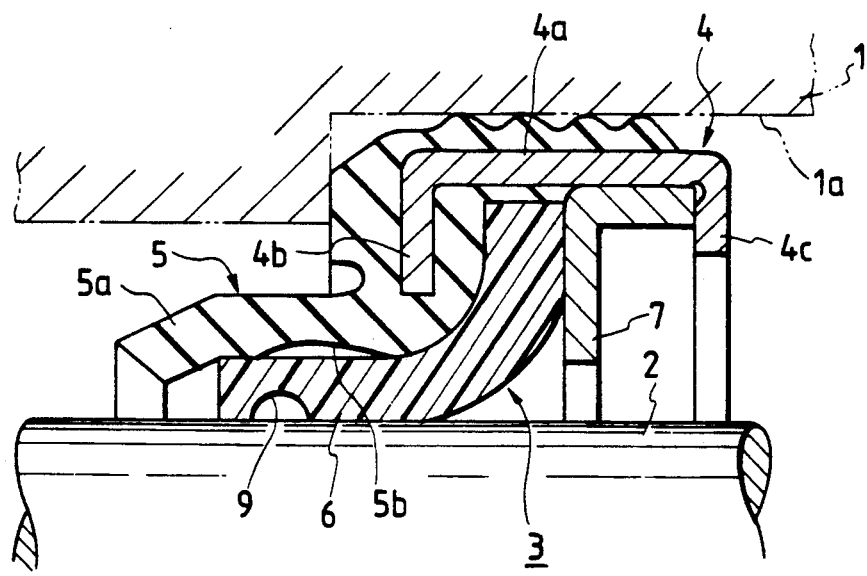
FIG. 1 is a sectional view of the first embodiment of a lip seal device according to this invention.

A first embodiment of the invention is as shown in FIG. 1. In FIG. 1, a rotary shaft 2 inserted into a stepped hole 1a formed in a housing 1 is rotatably supported, and the space between the inner wall of the stepped hole 1a and the outer wall of the rotary shaft is sealed with the lip seal device 3 according to the invention.

The lip seal device 3 is made up of four members: a metal case 4, a retaining member 5 made of a relatively soft material such as rubber, a lip 6 made of a material such as PTFE which is relatively hard and high in durability, and a metal spacer 7.

The case 4 is in the form of a ring surrounding the rotary shaft 2, and it is U-shaped in axial section; that is, the case 4 has a cylindrical part 4a extended axially, and flanges 4b and 4c extended respectively from both ends of the cylindrical part radially inwardly.

The retaining member 5 is joined with the case 4 by vulcanization or adhesion in such a manner that it covers the outer wall of the cylindrical part 4a, the outer and inner walls of the flange 4b and the inner wall of the cylindrical part 4a.

More specifically, the retaining member 5 includes a retaining part 5a which is extended from the radially inner end of the flange 4b obliquely forwardly along the rotary shaft 2. The retaining part 5a, when assembled, acts to urge the front end portion of the lip 6 towards the rotary shaft 2 so that the inner wall of the front end portion of the lip 6 is in close contact with the rotary shaft 2. The front end portion of the retaining part 5 is spaced away from the rotary shaft 2 so as to eliminate the difficulty that the retaining part 5a slidably contacts the rotary shaft 2 to impede lubricating conditions for the lip 6.

In order to space the retaining member 5 from the surface of the lip 6, a spacing part or groove 5b is formed in the base portion of the retaining part 5a of the retaining member 5, which portion is closer to the flange 4b of the case 4. With the aid of the spacing part or groove 5b, sealed fluid pressure can be concentrated to the retaining part 5a, so that the front end portion of the lip 6 can be positively brought into close contact with the rotary shaft. Hence, even when the front end portion of the lip 6 vibrates, or it is vibrated because of the eccentricity or play of the rotary shaft, the retaining member 5 follows the vibration satisfactorily, as a result of which the inner wall of the front end portion of the lip 6 is kept in close contact with the rotary shaft 2 at all times.

The radially outer peripheral portion of the lip 6 is abutted against the portion of the retaining member 5 which portion covers the inner wall of the flange 4b and the inner wall of the cylindrical part 4a, and it is coupled liquid-tight to the case 4 through the spacer 7 interposed between the flange 4c and the outer peripheral portion of the lip 6.

The inner peripheral portion of the lip 6 is curved in such a manner as to protrude towards the sealed fluid or to the left. The inner wall of the inner peripheral portion thus curved is elastically abutted against the surface of the rotary shaft 2 by its own elasticity or the elasticity of the above-described retaining part 5a, so that leakage of the sealed liquid on the left of the lip 6 into the air on the right is prevented. An annular groove 9 is formed in the seal surface of the lip 6 which is in close contact with the rotary shaft 2, in such a manner that the groove is coaxial with the lip 6.

In the lip 6, the part including the annular groove 9 is smaller in thickness than the remaining, and accordingly it is readily deformed when the sealed liquid pressure is applied thereto. As a result, in the lip 6, the lip's parts on both sides of the annular groove 9 are more strongly abutted against the rotary shaft than the remaining. That is, the contact parts of the lip are brought into contact with the rotary shaft circumferentially continuously linearly or like an endless belt. Thus, formation of one annular groove 9 provides two annular contact parts, which provides a double seal action.

The retaining member 5 adapted to retain the front end portion of the lip 6 does not take part in the sealing action on the rotary shaft. Therefore, the sealing effect will not be affected even if the retaining member 5 is made of a soft material such as rubber. Furthermore, the formation of the retaining member 5 with such a soft material provides the following effects or merits: Even when the lip seal device 3 is greatly vibrated, or when the rotary shaft 2 is large in eccentricity or plays greatly, the front end portion of the lip 6 can be maintained in close contact with the rotary shaft 2 by the soft retaining member 5. That is, under the adverse conditions as described above, the seal effect is stable and excellent.

On the other hand, it has been confirmed that, if the front end portion of the retaining member 5 is brought into contact with the rotary shaft 2 for the purpose of sealing, the lubricating conditions for the sealing surface of the lip 6 are impeded, and accordingly the sealing surface is damaged, so that the lid seal device is lowered in durability. However, in the lip seal device according to the invention, the front end portion of the retaining member 5 is spaced from the rotary shaft 2, which eliminates the above-described difficulty. Thus, it is necessary that at least part of the front end portion of the retaining member 5 is spaced from the rotary shaft 2.

In addition, as shown in FIG. 1, it is preferable that the front end portion of the retaining member 5 is protruded from the front end portion of the lip 6 toward the sealed fluid's side so as to approach the rotary shaft 2. According to this arrangement, the portion included by the inner peripheral front end portion of the retaining part 5a and the front end portion of the lip 6 is formed.

When oil is supplied to the side of sealed fluid, the oil can be held by this portion so that the lubricating condition of the front end portion of the lip 6 is improved. Further, it is expected that the contact portion between the lip 6 and the retaining member 5 is protected from undesirable damage and is kept smoothly therebetween.

Figure 2:
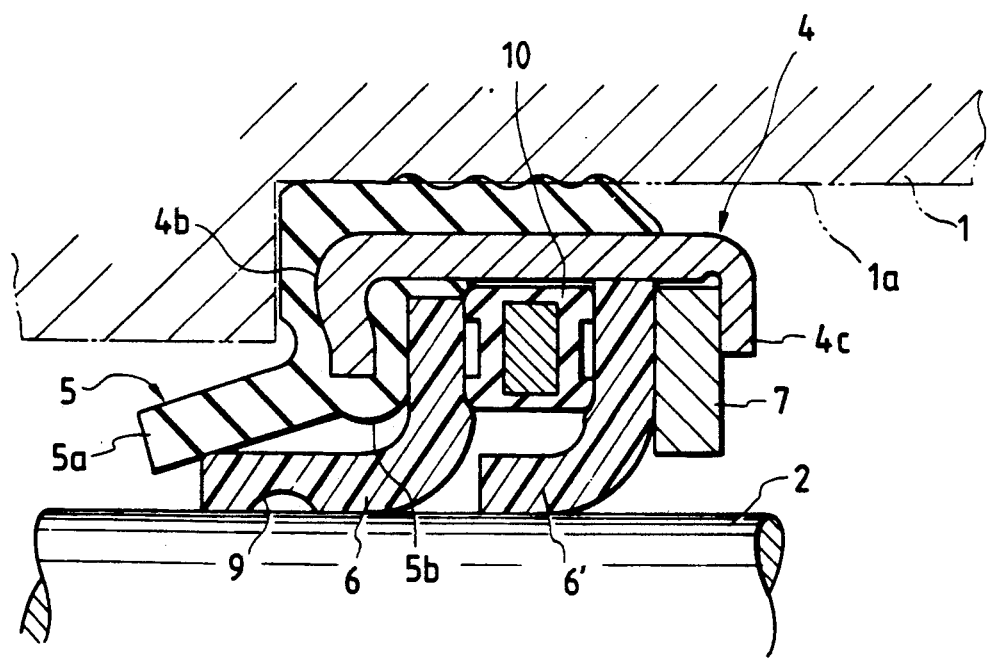
FIG. 2 is a sectional view of the second embodiment of a lip seal device according to this invention.

A second embodiment of the invention will be described with reference to FIG. 2. The same parts of as those of the first embodiment are designated by the same reference numerals.

The second embodiment is different from the first embodiment shown in FIG. 1 only in that two lips 6 and 6' are secured to the case and a spacer 10 is located between the first lip 6 and the second lip 6'. The spacer 10 is made of a base plate and a rubber which surrounds the spacer and is formed like a ring.

As is apparent from the above description, the lip seal device according to the invention has the excellent sealing effect which is based on the double seal action of the lip's parts on both sides of the annular groove formed in the lip. Furthermore, since the retaining member depressing the front end portion of the lip does not take part in the sealing action, it can be made of a soft material such as rubber. Accordingly, even when the lip seal device is greatly vibrated, or when the rotary shaft is large in eccentricity or plays greatly, the front end portion of the lip can be maintained abutted against the rotary shaft by the retaining member, thus providing an excellent sealing effect at all times.

While there has been described in connection with the preferred embodiment of this invention, it will be obvious to those skilled in the art that various changes and modifications may be made therein without departing from the invention, and it is aimed, therefore, to cover in the appended claims all such changes and modification as fall within the true spirit and scope of the invention.

What is claimed is:

1. A lip seal device for sealing the gap between a housing and a rotatably supported rotary shaft, comprising:

a case surrounding said rotary shaft;

a lip seal having an outer peripheral base end portion which is secured to said case, and an inner peripheral front end portion which is curved toward a sealed fluid and includes a sealing surface in sliding contact with the outer surface of said rotary shaft, a first annular groove being formed in the sealing surface of said lip seal and being continuous around the circumference of said rotary shaft;

an elastic retaining member having an outer peripheral base end portion secured to said case and an inner peripheral front end portion circumscribing the outer surface of the front end portion of said lip seal so as to urge the front end portion of said lip seal towards said rotary shaft, the front end portion of said retaining member being spaced from said rotary shaft wherein said retaining member has a base portion between the outer peripheral base end portion and the inner peripheral front end portion thereof and a second annular groove is formed in the base portion and spaced from said lip seal to concentrate sealed fluid pressure on the front end portion of said retaining member wherein said retaining member contacts said lip seal on immediate opposite sides of said second annular groove.

2. A lip seal device for sealing the gap between a housing and a rotatably supported rotary shaft, comprising:

a case surrounding said rotary shaft;

a lip seal having an outer peripheral base end portion which is secured to said case, and an inner peripheral front end portion which is curved toward a sealed fluid and includes a sealing surface in sliding contact with the outer surface of said rotary shaft, a first annular groove being formed in the sealing surface of said lip seal and being continuous around the circumference of said rotary shaft;

an elastic retaining member having an outer peripheral base end portion secured to said case and an inner peripheral front end portion circumscribing the outer surface of the front end portion of said lip seal so as to urge the front end portion of said lip seal towards said rotary shaft, the front end portion of said retaining member being spaced from said rotary shaft wherein said front end portion of said retaining member protrudes from the front end of said lip seal toward the sealed fluid side so as to approach said rotary shaft and wherein said retaining member has a base portion between the outer peripheral base end portion and the inner peripheral front end portion thereof, and a second annular groove formed in the base portion and spaced from said lip seal to concentrate sealed fluid pressure on said retaining member wherein said retaining member contacts said lip seal on immediate opposite sides of said second annular groove.

* * * * *